United States Patent [19]
Woytowitz et al.

[11] Patent Number: 6,088,621
[45] Date of Patent: Jul. 11, 2000

[54] PORTABLE APPARATUS FOR RAPID RE-PROGRAMMING OF IRRIGATION CONTROLLERS

[75] Inventors: Peter J. Woytowitz, San Diego; Michael J. McGrady, Oceanside, both of Calif.

[73] Assignee: Hunter Industries, Inc., San Marcos, Calif.

[21] Appl. No.: 09/014,497

[22] Filed: Jan. 28, 1998

Related U.S. Application Data

[63] Continuation-in-part of application No. 08/668,543, Jun. 21, 1996, abandoned.

[51] Int. Cl.⁷ .................................................. G05B 11/01
[52] U.S. Cl. .................. 700/16; 700/14; 700/15; 700/17; 172/2; 172/4; 172/9; 172/371; 137/550; 137/551; 137/552
[58] Field of Search ............................. 700/12, 13, 14, 700/15, 16, 17, 164; 137/550, 551, 552, 553, 554; 701/2, 50–53; 172/2, 3, 6, 7, 9, 371

[56] References Cited

U.S. PATENT DOCUMENTS

| | | | |
|---|---|---|---|
| 4,082,117 | 4/1978 | Peckham | 137/870 |
| 4,760,547 | 7/1988 | Duxbury | 700/17 |
| 4,922,407 | 5/1990 | Birk et al. | 700/16 |
| 4,937,732 | 6/1990 | Brundisini | 700/17 |
| 5,038,268 | 8/1991 | Krause et al. | 700/16 |
| 5,173,855 | 12/1992 | Nielsen et al. | 700/17 |
| 5,444,611 | 8/1995 | Woytowitz et al. | 700/16 |
| 5,568,376 | 10/1996 | Benmergui et al. | 700/16 |
| 5,748,466 | 5/1998 | McGivern et al. | 700/17 |
| 5,956,248 | 9/1999 | Williams et al. | 700/16 |

Primary Examiner—Paul P. Gordon
Assistant Examiner—Ramesh Patel
Attorney, Agent, or Firm—Michael H. Jester

[57] ABSTRACT

An irrigation control system including an irrigation controller, a portable data shuttle, and a personal computer. The user creates a watering program comprising watering schedules by using a graphical user-friendly interface of the personal computer. The watering program is then downloaded into the portable data shuttle. The portable data shuttle is coupled to an irrigation controller and a first watering schedule is downloaded from the portable data shuttle into the irrigation controller in a matter of seconds. At a later time, the data shuttle automatically downloads a second watering schedule replacing the first schedule, thereby updating the irrigation programming. For example, a new watering schedule may be automatically downloaded at preselected intervals to accommodate the changing seasons. The portable data shuttle includes voltage regulation circuits so that it can receive power from either the personal computer or the irrigation controller. The invention avoids the time consuming task of programming and re-programming an irrigation controller directly. Where numerous controllers are involved, the invention allows each to be programmed and reprogrammed in a matter of seconds instead of the usual ten to fifteen minutes per controller.

30 Claims, 4 Drawing Sheets

PORTABLE APPARATUS FOR RAPID RE-PROGRAMMING OF IRRIGATION CONTROLLERS

RELATIONSHIP TO PENDING APPLICATION

This application is a continuation-in-part of U.S. patent application Ser. No. 08/668,543 entitled "PORTABLE APPARATUS FOR RAPID PROGRAMMING OF IRRIGATION CONTROLLERS," now abandoned, filed Jun. 21, 1996 on behalf of inventor Peter J. Woytowitz et al. and assigned to Hunter Industries Incorporated of San Marcos, Calif. The noted application is incorporated by reference in the present application.

BACKGROUND OF THE INVENTION

1. Field of the Invention

The present invention relates to an irrigation control system employing improved controller programming techniques. More particularly, the present invention pertains to an irrigation control system that allows programming and automatic re-programming of watering schedules used by the irrigation control system.

2. Description of the Related Art

Irrigation controllers generally fall into two broad categories: stand-alone systems and networked systems. In networked controllers, a central host computer, such as a personal computer (PC), is connected by wire or RF transmission on a local area network to a number of satellite irrigation controllers. This type of irrigation control system is common in large commercial or municipal irrigation systems and on golf courses. This permits the sophisticated processing power and display of a PC to be utilized to simplify and speed up the programming process. Furthermore, in networked systems each irrigation controller is programmed from a single location, and the program is simply transmitted to the individual irrigation controllers.

Stand-alone irrigation control systems are typically used in residences, and include a self-contained programmable irrigation controller connected to a plurality of irrigation valves and sprinkler units. The stand-alone irrigation controller is programmed by the user to initiate watering times at particular valve stations at certain times of the day. The length of the watering cycle or run time must be calculated by the operator and entered into the controller for each station. This may involve two or more start times per station per day. This process is often complicated by confusing and cumbersome controller keyboards, entry switches, and operational programs. Even the most sophisticated solid state irrigation controllers utilize several switches and indicators which often have multiple functions assigned to them. Consequently, the ease of programming of this kind of irrigation controller has been less than satisfactory for many consumers.

Furthermore, these types of stand-alone irrigation control systems must be reprogrammed every time a user wishes to change the watering routine. When irrigation requirements change during the course of a year, for example, when summer changes to fall, the user must input a new watering program into the controller. Alternatively, some of the more sophisticated irrigation controllers allow the user to reduce the amount of water delivered by a percentage, but do not allow the irrigation schedule itself to be changed without re-programming of the controller.

In order to be competitively priced, conventional stand-alone irrigation controllers have very limited processing power and display size. For example, the stand-alone typical irrigation controller will have a four bit microcontroller and a very small LCD display. The result is a data entry process that is somewhat cryptic. Some manufacturers have attempted to simplify this data entry process, for example, by putting rotary dials on the controllers. However, the rotary dial essentially limits the number of possible parameters a user can change at any one point in time. Other ways of simplifying the programming are to change the architecture of the data to be entered. See, for example, U.S. Pat. Nos. 5,444,611 and 5,097,861 both assigned to Hunter Industries, Inc. of San Marcos, Calif. However, even with these improvements, the user must still enter, at a minimum, a run time for each station and numerous start times and watering intervals for each station or each program. This can be a painstaking task for a homeowner. Furthermore, the homeowner will have to reprogram the unit during a change in season and also each time there is a power outage if the backup battery is dead or missing.

Another drawback with programming stand-alone irrigation controllers is experienced by contractors who install large numbers of these devices. For example, when such a contractor is installing controllers in a new community, the contractor's installer will enter a watering schedule which is likely to be identical for each home. That installer or someone else may have to come back and make seasonal adjustments to the schedule of these controllers. Since it likely takes 10–15 minutes to program or reprogram the controller, this task represents a significant amount of time and money for the contractor. Unfortunately, it would be impractical and expensive to connect each of these irrigation controllers to a central processor as in networked systems.

SUMMARY OF THE INVENTION

It is therefore an object of the present invention to provide an improved technique for changing a program of a stand-alone irrigation controller.

It is also an object of the present invention to provide a way to automatically reprogram stand-alone irrigation controllers that overcomes the disadvantages of their limited processing power and limited display.

It is another object of the present invention to provide a means for automatically re-programming a large number of stand-alone irrigation controllers with the same program without requiring the manual entry of the same program for each controller.

It is also an object of the present invention to provide a way to quickly and easily automatically reprogram stand-alone irrigation controllers when changes are required or a program is lost due to a power outage.

It is also an object of the present invention to provide a technique for automatically re-programming stand-alone irrigation controllers which utilizes the processing power and superior graphical user interface of a PC to generate the program.

The present invention includes an improved irrigation control system as well as an improved method for re-programming stand-alone irrigation controllers. The invention permits a user to generate a program comprising watering schedules once and then to transfer the identical program to any number of unconnected irrigation controllers.

In accordance with the system of the present invention, the irrigation control system includes an irrigation controller for storing and executing a program comprising watering schedules and having an input port for receiving the program. A processor unit generates the program and includes an input unit for receiving data used to generate the program, and also includes an output port for downloading the program. A portable data transfer module includes a memory unit for storing the program and an I/O unit for removably coupling the portable data transfer module to either the processor output port or the irrigation controller input port. As a result, a program comprising the watering schedules generated by the processor unit can be carried in a portable data transfer module to a stand-alone irrigation controller to program the controller in a matter of seconds by simply plugging in the portable data transfer module. Furthermore, the processor unit employed may comprise a conventional PC with adequate processing capability to facilitate the generation of the program in a user friendly manner due to its graphical user interface (GUI).

In accordance with the method of the present invention, an irrigation controller is programmed by generating a program of watering schedules on a processor unit and then plugging a portable data transfer module into the processor. The program is then downloaded and stored in a portable data transfer module which is disconnected from the processor and carried to an irrigation controller units. The data transfer module is plugged into the irrigation controller and a watering schedule contained in the program is downloaded to the irrigation controller in a matter of seconds. The module remains plugged into the irrigation controller and at predetermined intervals downloads a new watering schedule to the irrigation controller.

Thus, the present invention permits stand-alone irrigation controllers to be programmed in an easy manner by generating the program containing the watering schedules on a PC. Once the program is generated, the module may be removeably connected to an irrigation controller and a watering schedule can be downloaded into the controller in a matter of seconds without repeating the programming process. At predetermined intervals, a new watering schedule is downloaded to the irrigation controller. This avoids the time consuming task of manually re-programming the irrigation controller to change a watering schedule.

BRIEF DESCRIPTION OF THE DRAWINGS

The nature, objects and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

The present invention provides an irrigation system and method which employs a portable data storage device to store an irrigation program comprising watering schedules generated on a computer. The portable storage device, referred to hereinafter as a data shuttle, is then used to program and reprogram an irrigation controller by simply plugging it into the irrigation controller and downloading a watering schedule at a predetermined time. This allows the user to generate the program comprising the watering schedules at a PC utilizing its powerful processing power and familiar user friendly GUI to ease the programming task. The time consuming and sometimes difficult task of programming an irrigation controller directly is thereby avoided.

Figure 1:
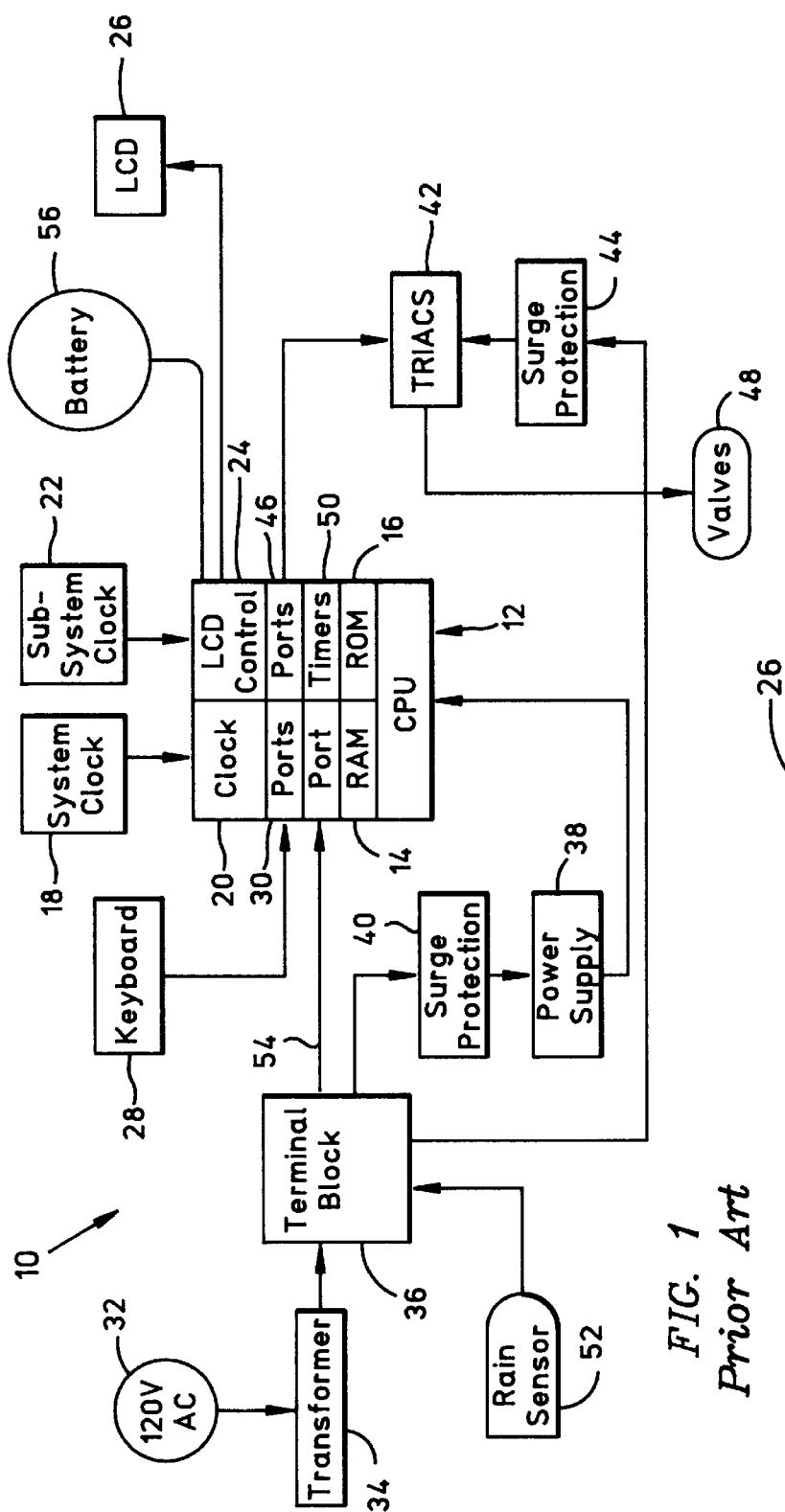
FIG. 1 is a block diagram of an irrigation controller in accordance with the prior art.

Referring now to FIG. 1, an exemplary irrigation controller 10 is depicted in accordance with the prior art. This irrigation controller 10 may be used, for example, to control the irrigation of landscaping at a single residence. It is controlled by a four bit microcomputer 12 having a central processing unit or CPU, a random access memory or RAM 14 and a read only memory or ROM 16. The microcomputer 12 may be, for example, an NEC 75306 integrated circuit. An external clock 18 is connected to an on-board clock circuit 20 of the microcomputer 12. An external sub-system clock 22 is connected to an onboard liquid crystal display or LCD control circuit 24 of the microcomputer 12. The LCD control circuit 24 controls a liquid crystal display or LCD 26 which, for example, is a one hundred segment LCD 26, illustrated in more detail in FIG. 2. A keyboard 28 transmits scan signals to ports 30 of the microcomputer 12. Power from a one hundred and twenty volt AC source 32 is stepped down by a transformer 34 to a twenty-four volt AC signal which is connected to selected terminals of a terminal block 36. This twenty-four volt AC signal is connected to a power supply circuit 38 through a surge protection circuit 40. The power supply circuit 38 supplies five volts DC to the microcomputer 12.

A plurality of triacs, collectively labeled as 42 in FIG. 1, are connected to the twenty-four volt AC signal from the terminal block 36 through another surge protection circuit 44. The microcomputer 12 has a plurality of output ports labeled 46 in FIG. 1. Ports 46 are used by the microcomputer 12 to selectively turn different triacs ON and OFF. These triacs energize corresponding sprinkler valves collectively labeled as 48 in FIG. 1.

The microcomputer 12 also includes onboard timers 50 which are utilized in executing the operational software of the CPU. A rain sensor 52 is connected through the terminal block 36 and a lead 54 to a port of the microcomputer 12. Information from the rain sensor 52 is used by the microcomputer 12 to suspend irrigation in the event of rain.

In the event of failure of the one hundred twenty AC power source 32, power to the microcomputer 12 is maintained by a nine volt battery 56. This battery will maintain current data in the RAM 14 and keep track of time for a minimum of one and a half days.

Figure 2:
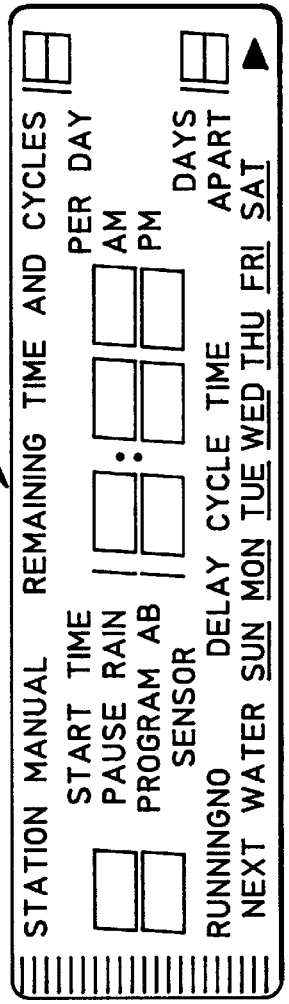
FIG. 2 is a block diagram of an LCD display used with the prior art irrigation controller illustrated in FIG. 1.

Referring to FIG. 2, the LCD display 26 of the prior art irrigation controller 10 is the primary focal point for the operator. The possible alphanumeric messages for messages which the LCD display 26 can indicate are shown in FIG. 2. Only selected words and numbers are illuminated by the LCD control circuit 24 at any time. Additional details of the irrigation controller 10 shown in FIGS. 1 and 2 may be found in U.S. Pat. No. 5,444,611 assigned to Hunter Industries, Inc., San Marcos, Calif., which is herein incorporated by reference in its entirety.

It will be appreciated that the low cost of irrigation controller 10 dictates use of the four bit microcomputer 12 and the LCD display 26. Irrigation controller 10 will therefore, not be equipped with the user interface, processing power, disk drive, etc., typically found in a personal computer. As a result, programming the irrigation controller requires the user to learn the specific programming commands and procedure, and once learned, generally will require ten to fifteen minutes to enter a program. Furthermore, it is frequently desirable to change the program more than once each year. Also, it is necessary to reprogram the controller 10 in the event of loss of power and battery backup. Consequently, while the prior art irrigation controller of U.S. Pat. No. 5,444,611 is easier to program than conventional irrigation controllers, it is desirable to further improve the programming process and the user interface in such controllers. It would be particularly advantageous to provide a much quicker way to program a large number of standalone irrigation controllers for use by, for example, a contractor installing and servicing irrigation controllers in tract housing or condominium developments.

Figure 3:
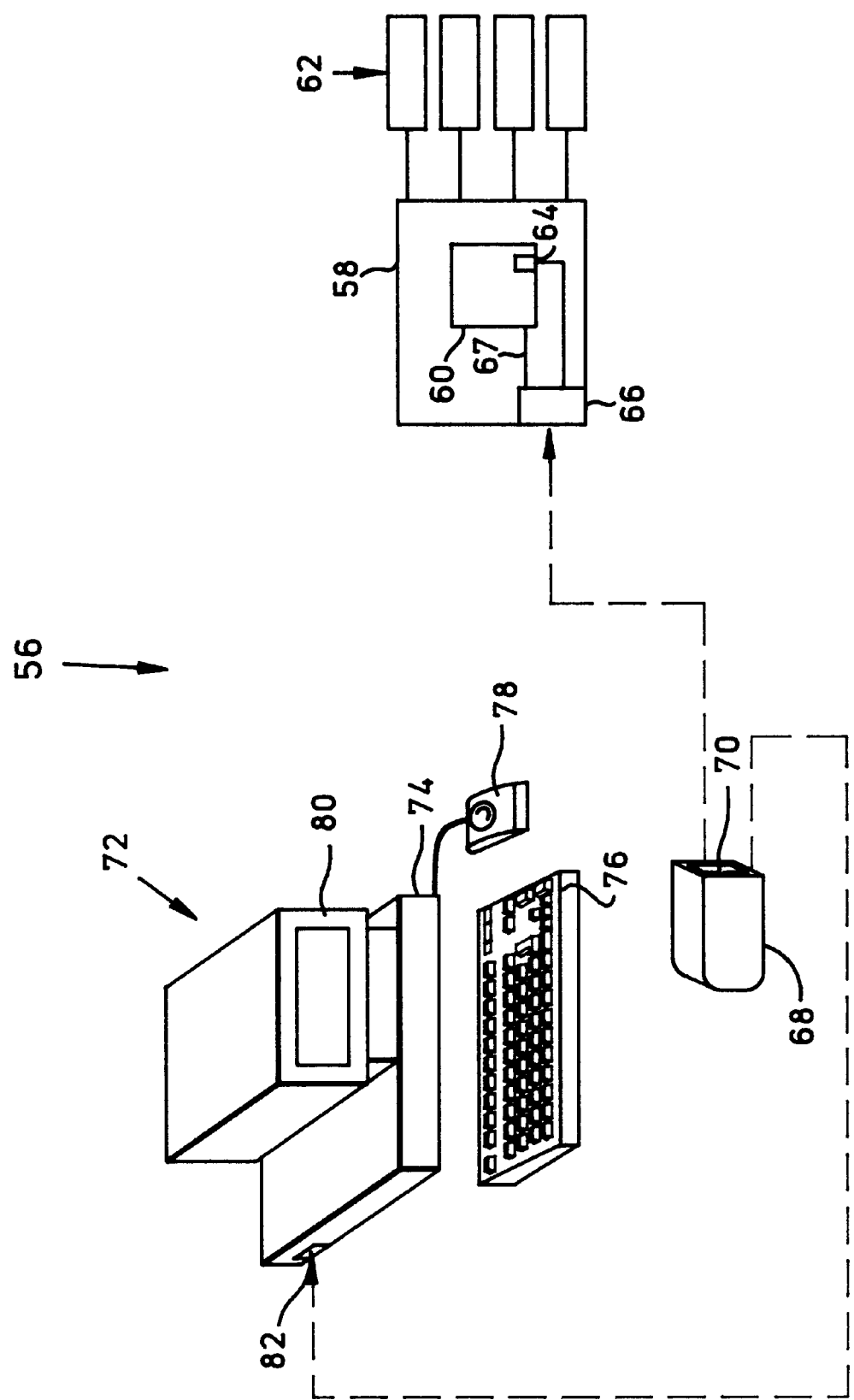
FIG. 3 illustrates a preferred embodiment of a system for programming irrigation controllers in accordance with the present invention.

FIG. 3 depicts a preferred embodiment of the irrigation controller system 56 of the present invention. It includes an irrigation controller 58 which is similar to the irrigation controller 10 with minor modifications as described below. Irrigation controller 58, for example, includes a microcomputer 60, similar to microcomputer 12 in FIG. 1, which contains a program comprising a plurality of watering schedules used to activate a plurality of irrigation valves 62. Microcomputer 60 includes an input port 64 which is connected to an electromechanical connecter 66.

A program comprising watering schedules can be downloaded into the microcomputer 60 memory though connector 66. Connector 66 may be, for example, a twenty-five pin or nine pin D connector or other suitable conventional connector. Power is also provided to the connector 66 through power supply line 67. For example, the microcomputer 60 RAM memory may be used to store a watering schedule or schedules contained in the program. Since the irrigation controller 58 can receive schedules through connector 66, a keyboard and LED display such as keypad 28 and display 26 shown in FIGS. 1 and 2 are not necessary for programming. However, it is desirable that irrigation controller 58 still includes the keyboard and display for those instances where external programming in accordance with the present invention cannot be accomplished. The display will also be useful to provide an on-site display of the various parameters of the current program.

Irrigation controller 58 also includes modified operational software stored in a ROM similar to ROM 16 in FIG. 1 in order to accommodate programming through the external port 64. In particular, irrigation controller 58 is programmed by a program stored in a data shuttle unit 68 which has a single input-output (I/O) connector 70 used to transfer power and data signals. The shuttle unit includes an injection molded small, hand held plastic housing which encloses and supports the electromechanical I/O connector 70, which consists of an RS232 connector and a circuit board (not shown) containing the components shown in FIG. 4.

A computer 72 is used to generate the watering schedules included in the program. It may be a conventional personal computer or other computer with comparable functions. The computer 72 includes a CPU 74, a keyboard 76, a mouse 78, and a color CRT display 80. It will be appreciated that due to the relatively sophisticated processing power of today's PCs, computer 72 can be programmed in a way which easily facilitates the generation of the watering schedule program by, for example, means of the GUI made possible by, for example, the WINDOWS 95 (Trademark) operating system in conjunction with the display 78, keyboard 76, and mouse 78. The information will be developed in a user-friendly manner via a WINDOWS 95 compatible application program running on the computer 72. The process of generating watering schedules will be described in more detail below with reference to FIG. 5.

Once the program containing the watering schedules is generated, the data shuttle 68 can be plugged into the computer 72 by connecting I/O connector 70 with an RS232 connector 82 on the back panel of the CPU 74. Connector 82 is a serial port that includes data and power lines to provide both data and power to the data shuttle 68. The program can then be downloaded through connector 82 into the data shuttle 68. Once loaded with the program, data shuttle 68 may be plugged into an irrigation controller 58, as indicated by the phantom lines in FIG. 3, in order to upload a watering schedule contained in the program into the irrigation controller. In this way, the irrigation controller 58 is programmed in a matter of seconds as opposed to ten or fifteen minutes required with conventional irrigation controllers.

As mentioned above and described in more detail below, the data shuttle 68 may store several watering schedules, either as discrete programs or as part of a larger program, and may be equipped with a switch to select one of various programs stored therein. As a result, personal computer 72 can be used to generate several watering schedules. All of these schedules may be loaded into the data shuttle 68 at the same time. The data shuttle 68 is simply plugged into the appropriate irrigation controller 58, and the irrigation controller is programmed with a watering schedule. Thereafter, the data shuttle 68 may automatically reprogram the controller with different watering schedules quickly and easily. Alternatively, a switch on data shuttle 68 may be used to select the next-program to be loaded.

Figure 4:
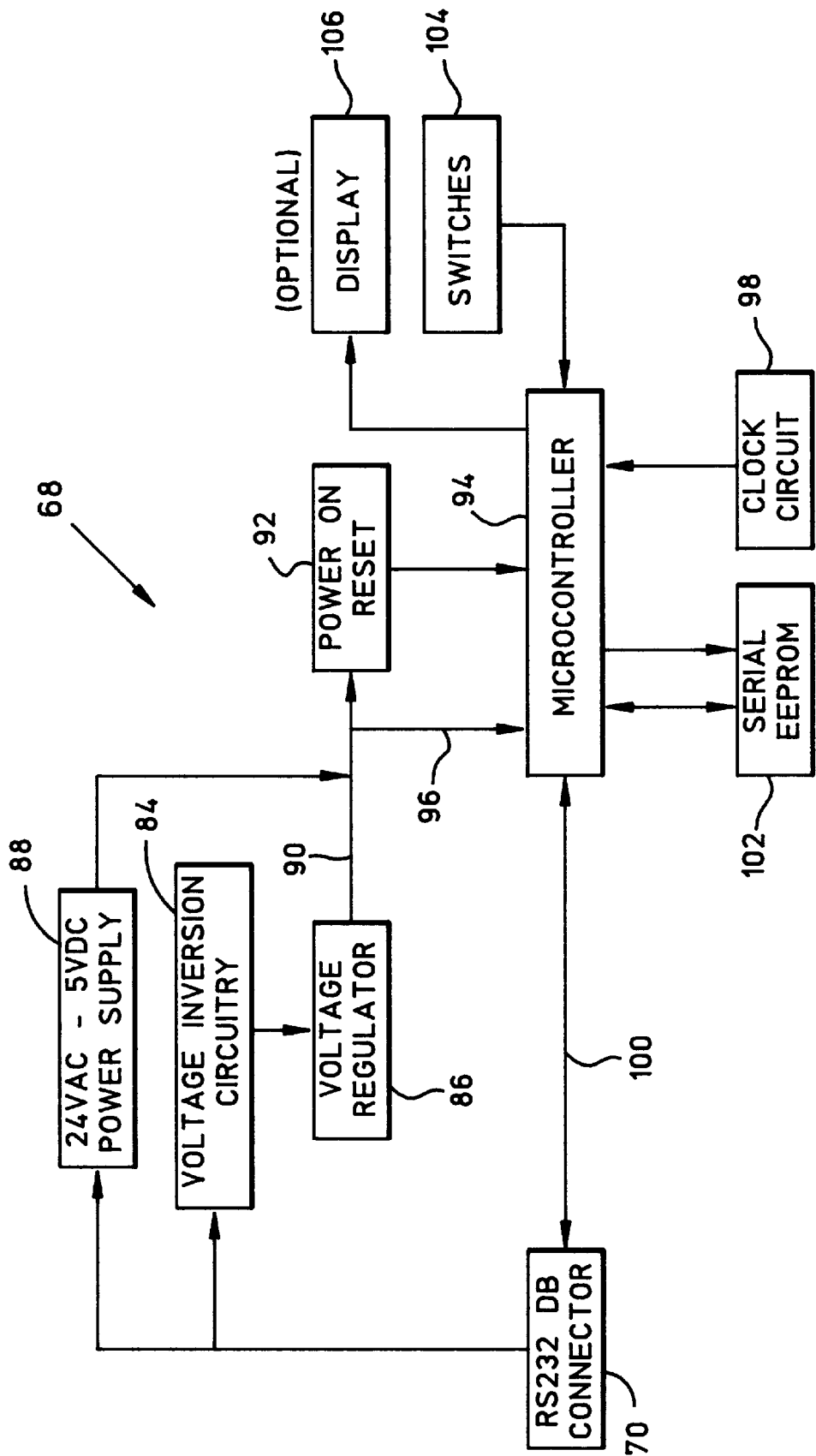
FIG. 4 is block diagram of a preferred embodiment of a data shuttle utilized with the present invention.

Referring now to FIG. 4, the data shuttle 68 is shown in more detail. The I/O connector 70 provides both mechanical and electrical coupling for the data shuttle 68. It receives both power and data via the RS232 connector 82 on the personal computer CPU 74. It will be appreciated that different power sources will be used by the data shuttle 68 depending on whether it is plugged into the computer or the irrigation controller 58. When the data shuttle 68 is plugged into the computer serial port 82, power will be derived via one of the handshake lines of the port. Current on these lines is limited to ten milliamps. Voltage on this line in the RS232 connector 82 will typically be minus ten volts. In the preferred embodiment, the data shuttle will require plus five volts. Therefore, the minus ten volts from the computer must be converted to plus five volts before it can be used by the data shuttle 68. In order to accomplish this, data shuttle 68 includes a voltage inversion circuit 84 which simply converts the minus ten volts to plus ten volts. A 555 timer circuit may be used for the voltage inversion circuit 84. Next, voltage regulator 86 steps down the plus ten volt signal into a plus five volt signal.

On the other hand, when the data shuttle 68 is plugged into an irrigation controller 58, the power supply signal provided will typically be twenty-four volts AC. This is received by I/O connector 70 and is converted via rectification and regulation by a conventional power supply 88. A plus five volt signal from power supply 88 is transmitted on line 90 to a power-on-reset circuit 92. This circuit 92 monitors the power to a microcontroller 94 to assure a clean reset on power 20 up. Upon plugging into either the computer 72 or the irrigation controller 58, the plus five volt signal on line 90 will cause the microcontroller 94 to reset through the power on reset circuit 92. Microcontroller 94 may comprise a conventional inexpensive microcontroller such as the PIC 16C series CMOS microcontroller available from Microchip Technology Inc. of Chandler, Ariz.

The plus five volt signal from the power supply 88 is also received by the microcontroller 94 via line 96. A clock circuit 98 is included in the data shuttle 68. The circuit 98 may comprise a conventional ceramic resonator that provides a clock signal to the microcontroller 94, a data clock that provides current time and date information to the microcontroller 94, and a battery connected to the data clock for continuous operation of the clock during a power supply 88 interrupt. The battery may be a lithium battery, similar to that found in the common wristwatch, or any type of battery capable of supplying adequate power to the data clock over a substantial period of time.

Data is received through the I/O connector 70 by the microcontroller along line 100. This data contains the watering schedules generated on the computer 72. The microcontroller 94 preferably utilizes a non-volatile memory unit 102 to store the watering schedules. In the preferred embodiment, this memory is a 93 LC CMOS serial Electrically Erasable Programmable Read Only Memory (EEPROM) available from Microchip Corporation. Once loaded, the serial EEPROM memory 102 will retain the watering information for more than forty years without the use of batteries.

In the preferred embodiment, one or more switches 104 are connected to microcontroller 94 which are used to initiate various operations. A display unit 106 such as an LED display is utilized to facilitate switching. For example, switches 104 may be used to control whether data is to be uploaded or downloaded. The state of the switches 104 may be displayed by the display 106. In addition, in the case where multiple watering schedule programs are being stored in the memory 102, switches 104 may be used to control which of the programs are to be downloaded. By way of example, switches 104 may be a row of miniature so-called DIP switches similar to those used to set the code in a garage door opener transmitter.

In operation, once the microcontroller 94 is powered up by connection to either the computer 72 or the irrigation controller 58, it monitors the settings of the switch 104 and/or the I/O connector 70 to determine the device to which it is connected. If it is connected to the computer 72, the microcontroller 94 will receive the data from the computer via the I/O connector 70. It will then store this information in the memory 102. If the data shuttle 68 is connected to an irrigation controller 58, the data shuttle will monitor the settings of the switch 104 to determine which program to send. It will then read the memory 102 and transfer this information to the irrigation controller 58. At a predetermined interval, the data clock included in clock circuit 98 signals the microcontroller 94 that a new watering schedule is to be implemented. The microcontroller 94 then loads a new watering schedule from the serial EEPROM 102 and delivers it to the connector 70 via line 100. The new watering schedule is used to reprogram the microcomputer 12. This re-programming may occur at user defined intervals such as monthly, as a result of data generated from a database such as an almanac, or as a result of data gathered by external sensors and communicated to the irrigation controller system 56. For example, temperature, wind and moisture sensors may be connected to the controller system 56 and used to determine when a watering schedule needs to be changed.

Figure 5:
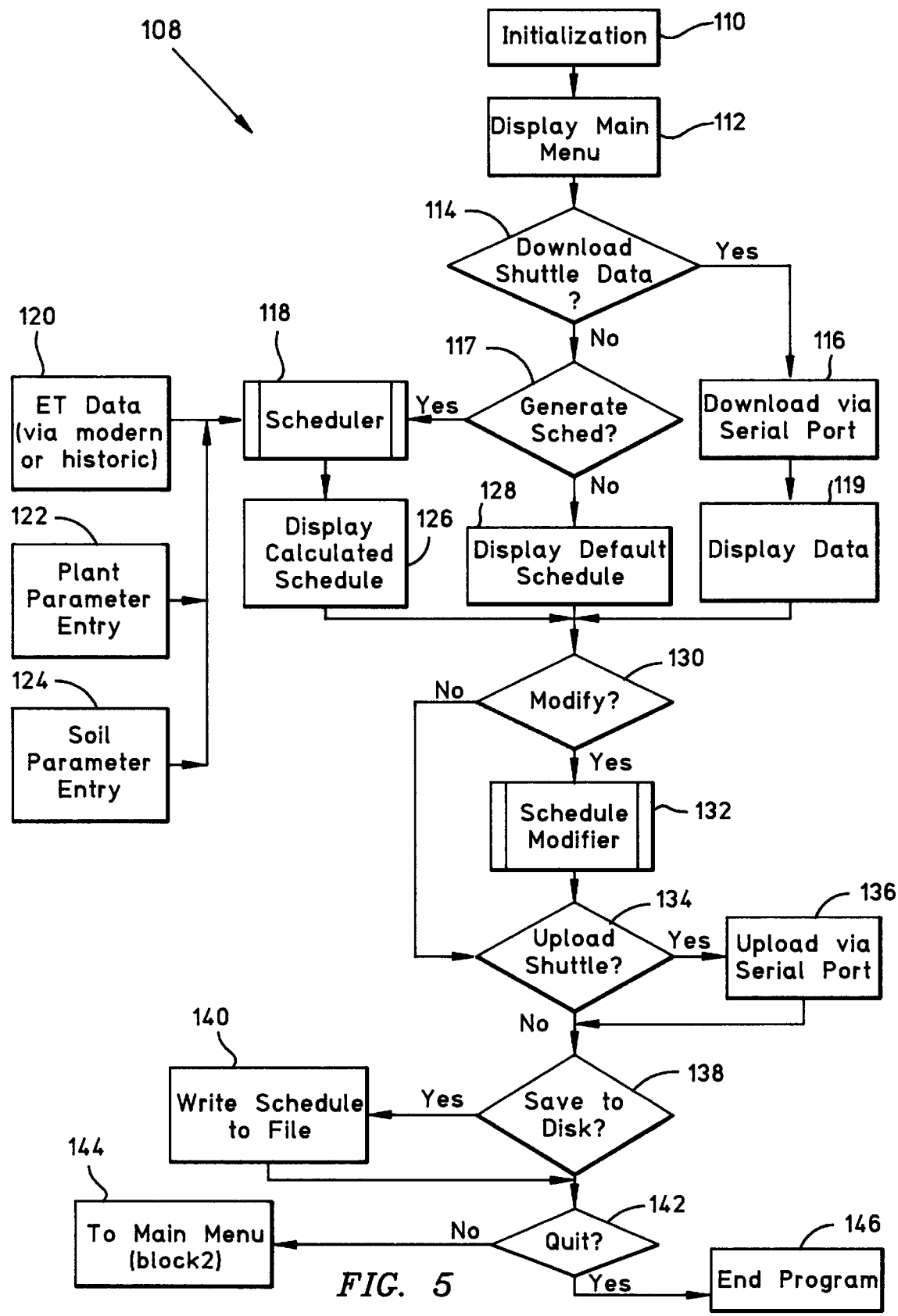
FIG. 5 is a flowchart of a sequence of steps executed by a personal computer to generate an irrigation program comprising watering schedules which may be stored in the data shuttle illustrated in FIG. 4.

Referring now to FIG. 5, there is illustrated a flow chart of an application program for use with the present invention.

In the preferred embodiment, an application program implementing this flow chart is installed in a WINDOWS 95 platform running on the personal computer 72. First, the program 108 is initialized in step 110. The main menu will then be displayed in step 112. Next, based on a user input in response to a command prompt, the user decides whether to download a watering schedule (schedule) from the data shuttle, in step 114. This may be desirable, for example, if the data shuttle 68 is set to load a particular schedule and the user wants a different schedule contained in the data shuttle to be modified. If so, data shuttle 68 is plugged into port 82 and the schedule therein is downloaded, in step 16. The data received can then be displayed on the color CRT 80 as shown in step 119.

Alternatively, if the user decided not to download a schedule from the data shuttle 68, the application program proceeds to step 117, and the user is asked whether he or she desires to generate a new watering schedule. If yes, scheduler 118 is activated, which utilizes various parameters to calculate an irrigation schedule. For example, the user may enter one or more of the following: evapotranspiration (ET) data, in step 120, from a modem or from historic data; plant parameter data, in step 122; and soil parameter data in step 124. With these three sets of data an optimal schedule can be generated. The user may also enter the type of controller to be programmed.

The scheduler 118 then performs the necessary calculations based on the input commands and parameters in order to generate the desired watering schedule. The functions of the scheduler 118 are well known in the art. For further details, see the incorporated by reference U.S. Pat. No. 5,444,611. The resulting schedule is then displayed on the CRT 80, as shown in step 126. If, instead, the user decides not to generate a new schedule in step 116, the program proceeds to step 128 and a default schedule is displayed.

Whether proceeding from step 126, 128 or 119, the program then asks the user whether he wants to modify the current schedule, in step 130. If so, the program proceeds to the schedule modifier 132, which, like scheduler 118, provides a user friendly interface for allowing the user to input the various parameters such as ET data, plant, air, and soil parameters in order to modify an existing schedule. The program then proceeds to step 134 which asks the user whether he or she is ready to upload a watering program into the data shuttle 68. If, in step 130, the user indicates he or she does not want to modify a schedule, the program proceeds directly to step 134. If it is desired to upload the data shuttle, the data shuttle is plugged into serial port 82, and the watering program is uploaded into the data shuttle 68 and stored therein, in step 136. The data shuttle 68 may then be used to program the irrigation controller 58 into which it was plugged, as described above. Also, the program loaded to the data shuttle may also be saved to disk in step 138.

Alternatively, if it was determined in step 134 that the user does not want to upload the data shuttle, the current watering program may be saved on disk in steps 138 and 140, and then the applications program asks the user if he or she is ready to end, in step 142. If not, the user proceeds back to the main menu 112 by means of step 144 or can terminate the applications program, in step 146. Where it is desired to store a plurality of watering programs on the data shuttle 68, it will be appreciated that switches 64 may be employed to select different watering programs and the process of program 108 can be repeated for each switch setting to load the data shuttle 68 with the desired number of schedules.

The irrigation control system 56 of the present invention may be utilized in a number of ways. For example, an individual homeowner can use his or her PC to generate a water scheduling program in a manner that would not be possible by programming a conventional irrigation controller 58 directly. In addition, a contractor installing numerous irrigation controllers in a new housing development need only generate one watering program on the computer 72 and then download that program to any number of irrigation controllers. This can be done in a matter of seconds for each controller. In the past, each controller, even if they all had identical programs, still had to be programmed manually at approximately ten to fifteen minutes each. Thus, the present invention yields a very large time saving where a contractor has a large number of controllers to program.

Furthermore, such a contractor may have a contract to maintain and update these scheduling programs for a large number of irrigation controllers. This might require changing the program two, three, or more times per year. In the event of a power outage where the battery backup also fails, each irrigation controller must be reprogrammed. As a result, a contractor may save a great deal of time in re-programming a large number of irrigation controllers by using the present invention.

While there have been shown what are presently considered to be the preferred embodiments of the invention, it will be apparent to those skilled in the art that various changes and modifications can be made herein without departing from the scope of the invention as defined by the appended claims. For example, the irrigation control system 56 might also be used to allow a liquid fertilizer to be released concurrent with the irrigation water delivered, the fertilizer being delivered at set points in time.

We claim:

1. An irrigation control system comprising:
   irrigation controller means for storing and executing a program including watering schedules, the controller means having an input port for receiving a watering schedule;
   processor means for generating a program including watering schedules, said processor means including manual input means for entering commands and data to generate the watering program and an output port for downloading the watering program; and
   portable data transfer means removably connectable to either the output port of the processor means or to the input port of the irrigation controller means for storing watering schedules downloaded from the processor unit for automatically re-programming the irrigation controller means,
   the portable data transfer means including a power input unit for receiving power from either the output port of the processor means or the input port of the irrigation controller means.

2. The system of claim 1 wherein the processor output port is a serial communications port.

3. The system of claim 1 wherein the power input unit includes a voltage regulator for regulating two different input power levels from the processor and irrigation controller respectively.

4. The system of claim 1 wherein the processor means further includes means for providing a graphical user interface to facilitate generating the watering program.

5. The system of claim 1 wherein the processor means further includes scheduling means for generating the watering program based on the received data.

6. The system of claim 5 wherein said data includes data selected from the group consisting of evapotranspiration data, plant information, air information, and soil information.

7. The system of claim 1 wherein the processor means further includes means for modifying the watering program.

8. The system of claim 1 wherein the processor means further includes memory means for storing the watering program.

9. The system of claim 1, wherein the data transfer means further includes:
   means for storing a plurality of watering programs;
   means for selecting one of the plurality of watering programs for downloading to the irrigation controller means;
   means for tracking time and date;
   microcontroller means for controlling the input, storage and output of the watering program, said microcontroller communicating with means for tracking time and date, and using a preselected time and a date to output a watering program at a predetermined time and date.

10. The system of claim 9, wherein the portable data transfer means includes a display for displaying the watering program stored therein.

11. The system of claim 10 wherein the portable data transfer means includes an I/O unit in the form of an RS232 port.

12. The system of claim 11 wherein the portable data transfer means includes switch means for determining whether the data transfer module is to receive or transfer the watering program.

13. The system of claim 1 wherein the portable data transfer means includes an electrically erasable programmable read only memory.

14. The system of claim 13 wherein the portable data transfer means further includes an outer package for enclosing the memory.

15. A portable irrigation program transfer unit comprising:
   I/O unit for removably coupling to either an irrigation program processor or to an irrigation controller;
   means for storing a program comprising watering schedules received from the irrigation program processor through the I/O unit;
   means for controlling the input of each watering schedule received from the irrigation program processor;
   means for tracking a date and a time;
   means for controlling the output of each watering schedule to the irrigation program processor based upon a preselected date and a time; and
   a small hand-held plastic housing containing the I/O unit, storing means and controlling means.

16. The portable irrigation program transfer unit of claim 15 and further comprising a voltage regulator connected to the I/O unit for regulating different power levels from the irrigation program processor and from the irrigation controller respectively.

17. The portable irrigation program transfer unit of claim 15 wherein the controlling means comprises an integrated circuit microcontroller.

18. The portable irrigation program transfer unit of claim 17 and further comprising a display connected to the microcontroller for displaying the irrigation program stored therein.

19. The portable irrigation program transfer unit of claim 18 and further comprising switch means connected to the microcontroller for determining whether the transfer unit is to receive or transfer an irrigation program.

20. The portable irrigation program transfer unit of claim 19 wherein the switch means further permits the selection of one or more of a plurality of irrigation schedules for output to the irrigation controller.

21. A method of programming an irrigation controller, comprising:

generating with a graphical user interface a watering program containing watering schedules in a processor;

connecting the processor to a portable watering program storage device;

transferring the watering program from the processor to the portable watering program storage device and storing the program therein;

connecting the portable watering program storage device to an irrigation controller;

selectively receiving electrical power in the portable watering program storage device from the processor and the irrigation controller;

transferring a first watering schedule contained in the watering program from the portable watering program storage device to program the irrigation controller; and transferring a second watering schedule contained in the watering program from the portable watering program storage device to reprogram the irrigation controller at a preselected date and time.

22. The method of claim 21 and further comprising selectively receiving electrical power in the portable watering program storage device from the processor and the irrigation controller.

23. The method of claim 22, further comprising:

converting the electrical power received from a first voltage level to a second voltage level; and using the second voltage level power during the transferring step.

24. The method of claim 21 wherein the step of storing the program is performed utilizing a non-volatile memory.

25. The method of claim 21 wherein the step of storing the program comprises storing a plurality of programs received from the processor.

26. A method of programming an irrigation controller, comprising:

generating a watering program containing watering schedules in a processor;

connecting the processor to a portable watering program storage device;

transferring the watering program from the processor to the portable watering program storage device and storing the program therein;

connecting the portable watering program storage device to an irrigation controller;

selectively receiving electrical power in the portable watering program storage device from the processor and the irrigation controller;

transferring a first watering schedule contained in the watering program from the portable watering program storage device to program the irrigation controller; and transferring a second watering schedule contained in the watering program from the portable watering program storage device to reprogram the irrigation controller at a preselected date and time.

27. The method of claim 26 wherein the step of generating the watering program is performed with a graphical user interface.

28. The method of claim 26, further comprising:

converting the electrical power received from a first voltage level to a second voltage level; and using the second voltage level power during the transferring step.

29. The method of claim 28 wherein the step of storing the program is performed utilizing a non-volatile memory.

30. The method of claim 26 wherein the step of storing the program comprises storing a plurality of programs received from the processor.

* * * * *